United States Patent [19]
Des Jardins et al.

[11] Patent Number: 5,936,939
[45] Date of Patent: *Aug. 10, 1999

[54] DIGITAL NETWORK INCLUDING EARLY PACKET DISCARD MECHANISM WITH ADJUSTABLE THRESHOLD

[75] Inventors: George Thomas Des Jardins, Baden; Shirish S. Sathaye, Wexford, both of Pa.

[73] Assignee: FORE Systems, Inc., Warrendale, Pa.

[*] Notice: This patent issued on a continued prosecution application filed under 37 CFR 1.53(d), and is subject to the twenty year patent term provisions of 35 U.S.C. 154(a)(2).

[21] Appl. No.: 08/445,673

[22] Filed: May 22, 1995

[51] Int. Cl.$^6$ .................................................. H04L 12/56
[52] U.S. Cl. ........................ 370/229; 370/230; 370/234; 370/235; 709/235
[58] Field of Search ............................. 395/200, 200.15, 395/200.17, 200.65; 370/392, 17, 229, 230, 234, 235

[56] References Cited

U.S. PATENT DOCUMENTS

| | | | |
|---|---|---|---|
| 5,317,563 | 5/1994 | Oouchi et al. | 370/17 |
| 5,583,858 | 12/1996 | Hanaoka | 370/392 |

OTHER PUBLICATIONS

Parviz Yegani "performance models for ATM switching of mixed continuous–bit–rate and bursty traffic with threshold–based discarding", IEE publication 1992, pp. 1621–1627.

Allen R. Bonde, Jr. and Sumit Ghosh "a comparative study of fuzzy versus fixed thresholds for robust queue management in cell switching networks", IEEE publication, pp. 337–344, Aug. 1994.

Henning Schulzrinne and James F. Kurose and Dom Towsley "congestion control for real–time traffic in high speed networks", pp. 543–550, 1990.

S. Suri, D. Tipper and G. Meempat "a comparative evaluation of space priority strategies in ATM networks", pp. 516–523, 1994.

Allyn Romanow and Sally Floyd, "Dynamics of TCP Traffic over ATM Networks" Sigcomm '94 Aug. 1994, pp. 79–88.

*Primary Examiner*—Zami Maung
*Assistant Examiner*—Saleh Najjar
*Attorney, Agent, or Firm*—Ansel M. Schwartz

[57] ABSTRACT

A computer network includes a plurality of routing nodes, each routing node being connected to selected ones of the other routing nodes and at least some of the routing nodes being connected to one of a plurality of packet sources or one of a plurality of packet destinations. Each routing node routes packets that are generated by the packet sources to respective ones of the packet destinations, each packet including a plurality of serially-transmitted cells. At least some of the routing nodes, in response to detection of a selected degree of congestion, enable an "early packet discard control arrangement," in which they discards cells which they receive which are related to packets for which they did not receive a cell prior to enabling the early packet discard control arrangement. The routing nodes periodically adjust the degree of congestion at which they will activate the early packet discard mechanism in relation to information corresponding to rates of reception and transmission of cells over a selected period of time prior thereto.

41 Claims, 9 Drawing Sheets

DIGITAL NETWORK INCLUDING EARLY PACKET DISCARD MECHANISM WITH ADJUSTABLE THRESHOLD

FIELD OF THE INVENTION

The invention relates generally to the field of digital communications systems and more particularly to digital networks for facilitating communication of digital data in, for example, digital image, audio and video distribution systems and among digital computer systems.

BACKGROUND OF THE INVENTION

Digital networks have been developed to facilitate the transfer of information, including data and programs, among digital computer systems and other digital devices. A variety of types of networks have been developed and implemented using diverse information transfer methodologies. In some networks, such as the well-known Ethernet, a single wire is used to interconnect all of the devices connected to the network. While this simplifies wiring of the network in a facility and connection of the devices to the network, it results in generally slow information transfer, since the wire can only carry information, in the form of messages, from a single device at a time. To alleviate this to some extent, in some Ethernet installations, the network is divided into a number of sub-networks, each having a separate wire, with interfaces interconnecting the wires. In such installations, wires can carry messages for devices connected thereto simultaneously, which increases the number of messages that can be transferred simultaneously. It is only when a device connected to one wire needs to send a message to a device connected to another wire that wires in two or more sub-networks will be used, making them unavailable for use by other devices connected thereto.

To alleviate this, networks have been developed in which communications are handled through a mesh of routing nodes. The computer systems and other devices are connected to various ones of the routing nodes. Since the routing nodes themselves are interconnected in a variety of patterns, a number of paths may be available between pairs of the devices, so that if one path is congested, another may be used. Such an arrangement may result in a network which is more complicated than an Ethernet network, but it can provide substantially higher information transfer rates, particularly if optical fiber is used as the media interconnecting the routing nodes and devices. A problem which may arise with such networks is that, in such networks, a routing node or a device, when it is receiving information from another routing node or device in the network, does not have a mechanism to provide "flow-control" information to the transmitting routing node or device. While this does reduce the cost of a network, it may result in congestion, in which a routing node may receive information at a rate faster than it can transmit it.

This problem has been addressed in one type of network, namely, a network implemented in accordance with the ATM ("Asynchronous Transfer Mode") methodology. In such a network, a "packet" of data is transmitted from a source device to one or more destination devices in a series of "cells." If a routing node detects congestion, such that it is receiving cells faster than it can transmit them, it can make use of several mechanisms. In one such mechanism, identified as "early packet discard," which may be used if a moderate amount of congestion is experienced, the routing node first refuses to accept cells related to any new packets, but it attempts to continue transferring cells associated with packets it has already begin transferring. This may alleviate the congestion downstream of the routing node, or at least provide that it does not increase. However, the congestion may continue increasing to a point where the node activates a second mechanism, identified as "partial packet discard." In the partial packet discard mechanism, if the routing node, due to increased congestion, has to drop one cell for a packet that it has begun transferring, it will continue dropping the cells from the same packet because all of the cells for a packet are required to correctly reassemble the packet at the destination. If the partial packet discard mechanism is activated due to congestion, partial packet discard should reduce it, but the packets which have been discarded must be retransmitted by the source in any case, so the routing nodes's resources used to transfer the cells prior to activation of the partial packet discard mechanism were wasted.

SUMMARY OF THE INVENTION

The invention provides a new and improved digital network including an early packet discard mechanism with adjustable threshold, which enables the routing nodes to adjust the degree of congestion at which they will activate the early packet discard mechanism in relation to the cell traffic.

In brief summary, in one aspect the invention provides a computer network including a plurality of routing nodes, each routing node being connected to selected ones of the other routing nodes and at least some of the routing nodes being connected to one of a plurality of packet sources and/or one of a plurality of packet destinations. Each routing node routes packets that are generated by the packet sources to respective ones of the packet destinations, each packet including a plurality of serially-transmitted cells. At least some of the routing nodes, in response to detection of a selected degree of congestion, enable an "early packet discard control arrangement," in which they discards cells which they receive which are related to packets for which they did not receive a cell prior to enabling the early packet discard control arrangement. The routing nodes periodically adjust the degree of congestion at which they will enable the early packet discard control arrangement in relation to information corresponding to rates of reception and transmission of cells over a selected period of time prior thereto.

In a further aspect, the invention provides a routing node for use in connection with a computer network. The computer network includes a plurality of routing nodes for transferring packets, each packet including a plurality of serially-transmitted cells, generated by a plurality of packet sources to respective ones of a plurality of packet destinations. The routing node comprises a buffer and a buffer control. The buffer receives and buffers cells to be transmitted to other routing nodes in the network or to a packet destination. The buffer control selectively enables the buffer to receive and buffer cells. The buffer control enables an early packet discard control arrangement in which, when the buffer instantaneously buffers a selected number of cells, it disables the buffer from buffering cells which are related to packets for which it did not begin receiving cells prior to enabling the early packet discard control arrangement mechanism. The buffer control periodically adjusts the selected number in relation to information corresponding to rates of reception and transmission of cells over a selected period of time prior thereto.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
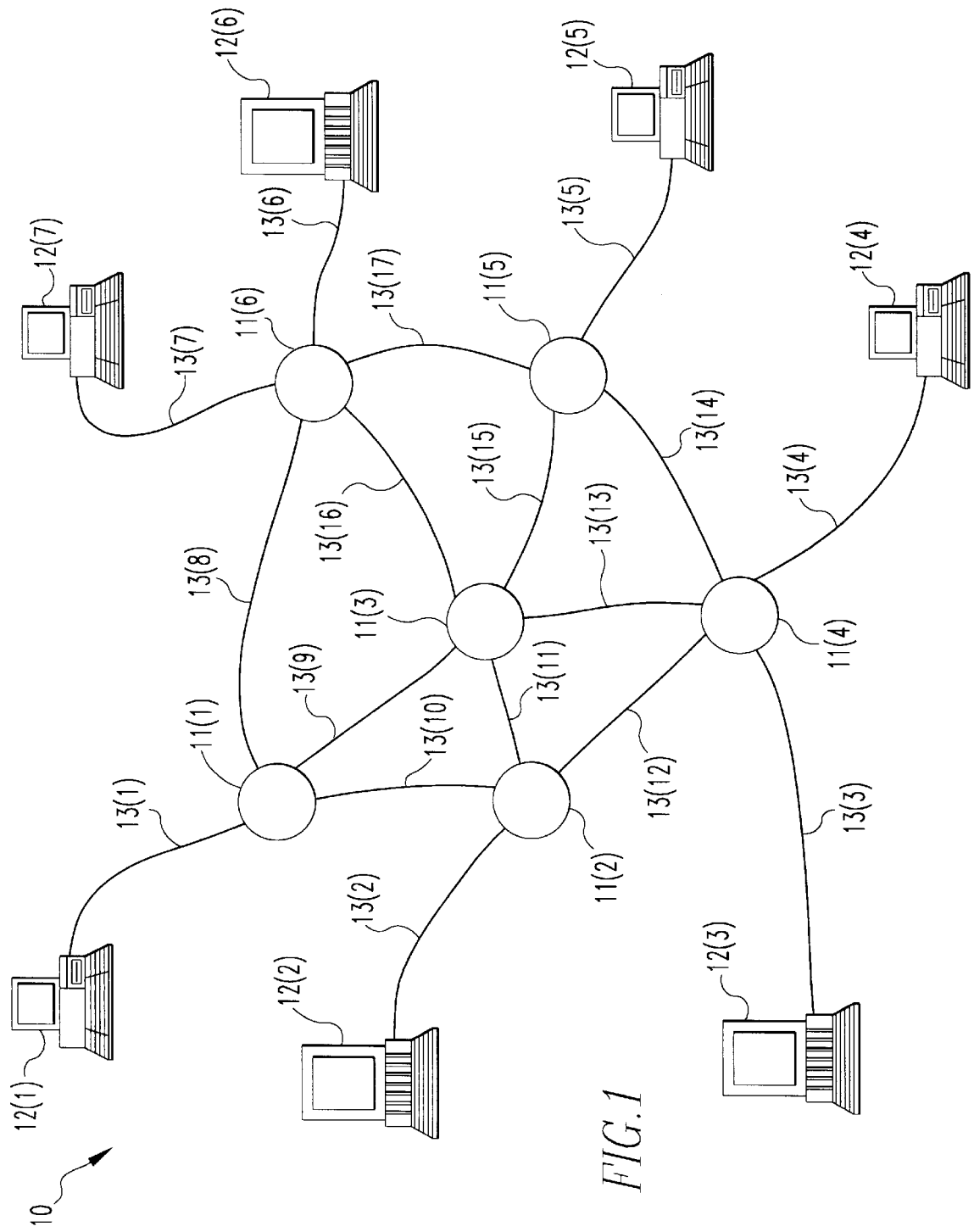
FIG. 1 schematically depicts a computer network including a routing node constructed in accordance with the invention.

FIG. 1 schematically depicts a computer network 10 including a plurality of routing nodes 11(1) through 11(N) (generally identified by reference numeral 11$n$)) for transferring signals representing data among a number of devices, which in FIG. 1 are represented by computer systems 12(1) through 12(M) (generally identified by reference numeral 12($m$)). The computer systems 12($m$), as is conventional, process data, in accordance with their program instructions to generate processed data. In their processing, a computer system 12($m_S$) (subscript "S" referencing "source") may, as a source computer system, need to transfer data, processed data and/or program instructions (all of which will be referred to herein generally as "information") to another, destination, computer system 12($m_D$) (subscript "D" referencing "destination"), which may need to use the transferred information in its operations. Each computer system 12($m$) is connected over a communication link, generally identified by reference numeral 13($p$), to a routing node 11($n$) to facilitate transmission of data thereto or the reception of data therefrom. The routing nodes 11($n$) are interconnected by communication links, also generally identified by reference numeral 13($p$) to facilitate the transfer of data thereamong. The communication links 13($p$) may utilize any convenient data transmission medium; in one embodiment, the transmission medium of each communication link 13($p$) is selected to comprise one or more fiber optic links. Each communication link 13($p$) is preferably bi-directional, allowing the routing nodes 11($n$) to transmit and receive signals among each other and with computer systems 12($m$) connected thereto over the same link; in the embodiment in which the communication links 13($p$) are fiber optic links, two optical fibers will be provided for each communication link 13($p$), each of which facilitates unidirectional transfer of optical signals.

Figure 2:
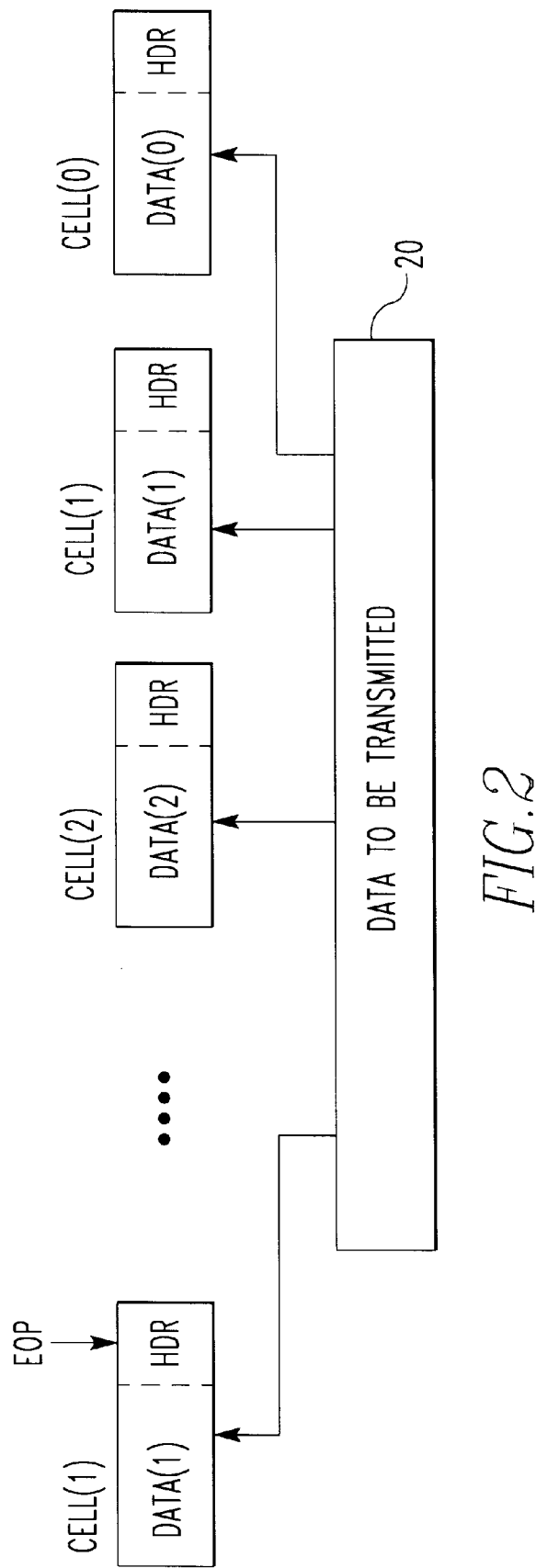
FIG. 2 schematically illustrates the structure of message packets and constituent message cells transferred over the network depicted in FIG. 1.

In one embodiment, the network 10 transfers data using the well-known "ATM" ("Asynchronous Transfer Mode") transfer methodology. That methodology is described in detail in C. Partridge, *Gigabit Networking*, (Reading MA: Addison Wesley Publishing Company, 1994), primarily in chapters 3 and 4, and D. McDysan, et al., *ATM Theory And Application* (McGraw Hill, 1995) and will not be described in detail. Generally, with reference to FIG. 2, in the ATM methodology, the computer systems 12($m$) and the router nodes 11($n$) transmit data in the form of fixed-length "cells." In the ATM data transfer methodology, for a packet 20 to be transmitted from a source computer system 12($m_S$) to a destination computer system 12($m_D$), the source computer system 12($m_S$) allocates the data packet 20 to a plurality of "cells," identified CELL(1) through CELL(I) (generally identified "CELL($i$)"), for transmission serially overeat communication link 13($p$) to initiate transfer thereof over the network 10. Each cell includes a header portion HDR($i$) and a data portion DATA($i$), with the header portion HDR($i$) including path identifier and "virtual circuit" information for controlling the transfer of the cell over the network 10, and the data portion DATA($i$) containing data from the packet 20. The data portion DATA($i$) of each cell is of fixed, predetermined length (in one embodiment forty-eight bytes) and so the source computer system 12($m_S$) will pad the data in the last data portion DATA($i$) if the amount of data in the packet 20 is not an integral multiple of the size of the data portion DATA($i$) of each cell to ensure that the last data portion DATA($i$) has the required length.

As noted above, the source computer system 12($m_S$) transmits the series of cells CELL(1) through CELL($i$) generated from a data packet 20 in order, and the network 10 is to deliver the cells to the destination computer system 12($m_D$) in the order in which they are transmitted. The destination computer system 12($m_D$) must receive all of the cells transmitted by the source computer system 12($m_S$) in order to reconstruct the packet 20. In the aforementioned ATM transfer methodology, the cells do not contain ordering information; and so the destination computer system 12($m_D$) determines the proper order to reconstitute the packet 20 from the order in which it receives the cells. The last cell CELL($i$) includes a set end of packet flag, designated EOP in FIG. 2, to indicate that it is the last cell for the packet.

As further noted above, header portion HDR($i$) includes path identifier and "virtual circuit" information, both of which control the transfer of the cell over the network 10. Each routing node 11($n$) uses the pat identifier and virtual circuit information for a cell CELL($p$) that it receives to over an input communication link identify an output communication link over which it is to transmit the cell to the next routing node or the destination computer system 12($m_D$). The virtual circuit information in the headers HDR($i$) of the cells CELL($i$) associated with a packet 20 will be the same, but it will differ for cells associated with different packets. Although a destination computer system 12($m_D$) will be receiving cells generated for a specific packet 20 in the order of the data in the packet, it may be contemporaneously receiving cells from the network 10 which originated at several source computer systems 12($m_S$), which cells may be received in an interleaved manner. The virtual circuit information in each cell CELL($i$) will enable the destination computer system 12($m_D$) to determine the packet 20 with which the cell is associated.

Figure 3:
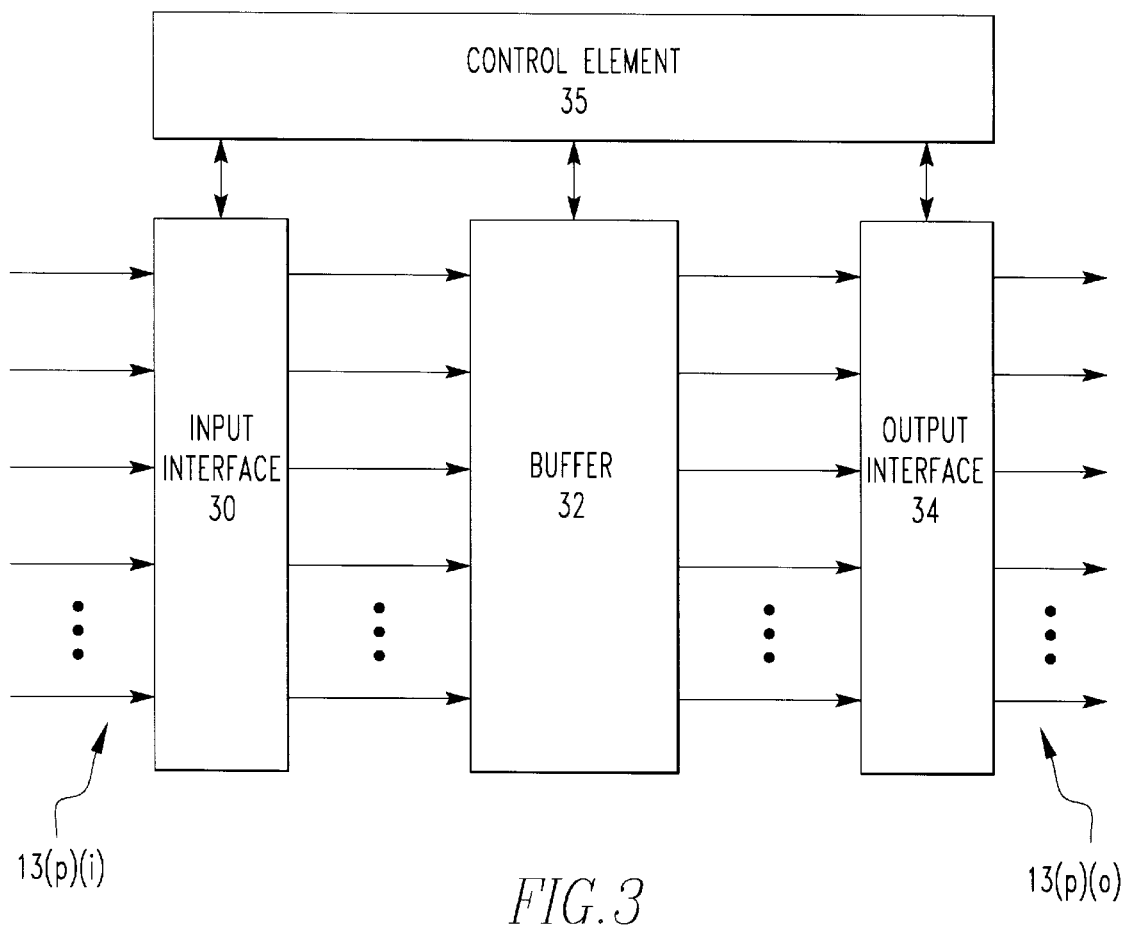
FIG. 3 schematically depicts a routing node, constructed in accordance with the invention, which is used in the computer network depicted in FIG. 1.

The routing nodes 11($n$) comprising network 10 all have generally the same structure, which will be described in connection with FIG. 3. With reference to FIG. 3, each routing node 11($n$) includes an input interface 30, a buffer 32, and an output interface 34, all under control of a control element 35. To facilitate bi-directional communications, the input interface 30 and output interface 34 will be connected to all of the communication links 13($p$) to which the routing node 11($n$) is connected to facilitate reception of signals from, and transmission of signals to, others of the routing nodes in the network 10 or ones of the computer systems 12($m$) to which the routing node 11($n$) is connected. In the case of the above-described embodiment in which the communication links 13($p$) are in the form of optical fibers, the input interface 30 is connected to particular ones of the communication links, namely, input communication links 13($p$)($i$), over which the routing node 11($n$) receives the optical signals, and the output interface 34 is connected to others of the communication links, namely, output communication links 13($p$)($o$), over which the routing node transmits the optical signals. It will be appreciated that each input communication links 13($p$)($i$) will constitute an output communication link over which a computer system 12($m$) or another routing node in the network 11 transmits signals, and each output communication link 13($p$)($o$) will constitute an input communication link over which a computer system 12($m$) or another routing node in the network 11 receives signals.

The input interface 30, under control of the control element 35, receives optical signals defining a cell CELL($n$) from the input communication links and converts them to electrical form, which it supplies to buffer 32 for buffering. The buffer 32 may comprise a unitary buffer which receives and buffers cells CELL($i$) in electrical form generated by the input interface 30 in response to the optical cells it receives from all of the input communication links 13($p$)($i$). Alternatively, the buffer 32 may comprise a plurality of buffer sections allocated to the separate output communication links 13($p$)($o$), each of which will receive and buffer cells CELL($i$) to be transmitted over from one or a selected sub-set of the output communication links 13($p$)($o$). The output interface 34 will generally transmit cells CELL($i$) to be transmitted over each output communication link 13($p$) ($o$) in the order in which they are received and loaded into the buffer 32. The output interface 34 receives the cells CELL($i$) which are buffered in the buffer 32, converts the cells, which at this point are still in electrical signal form, to optical form and couples the optical signals over the output communication links 13($p$)($o$). For each cell CELL($i$) transmitted by the output interface 34, the control element 35 may update the header portion HDR($i$) with a new path identifier and virtual circuit identifier as it is being transmitted.

As noted above, the control element 35 enables cells CELL($i$) received from the input communication links 13($p$) ($i$) to be buffered in the buffer 32. If the input buffer fills faster than the cells CELL($i$) can be drained from the buffer 32 and transmitted over the output communication links 13($p$)($o$), the buffer 32 may overflow, in which case the subsequently-received cells would not be buffered, but instead would be lost. The control element 35 makes use of two mechanisms in connection with the possibility of buffer overflow. In accordance with one mechanism, identified as "early packet discard," the control element 35 establishes a buffer contents threshold value, which, in accordance with the invention, it may adjust as described below. When the number of cells CELL($i$) buffered in the buffer 32 is greater than the buffer contents threshold value, the control element 35 will enable the buffer 32 to continue buffering of cells CELL($i$) associated with packets that it has previously enabled to be buffered; however, if a first cell for a new packet is received while such a condition exists, the control element 35 will not allow that cell CELL(0) and subsequently-received cells associated with the same packet to be buffered in the buffer 32.

In accordance with the second mechanism, identified as "partial packet discard," if the buffer 32 in fact overflows despite application of the early packet discard mechanism, the control element 35 will disable the buffer 32 from buffering cells CELL($i$) while it (the buffer) is full, and will allow those cells to be discarded. In addition, even after the number of cells buffered in the buffer 32 has been reduced so that it is no longer overflowing, the control element 35 will continue discarding cells associated with packets for which cells were discarded while the buffer 32 was in the overflow condition, using in particular the path and virtual circuit identifier information in the header portions HDR($i$) of the respective cells, until it detects a cell for which the EOP end of packet flag is set. Since, in the ATM transfer methodology, the cells CELL($i$) are transmitted and received in cell order, when the routing node 11($n$) begins discarding cells associated with a packet, the transfer of subsequent cells associated with the packet would be a waste of routing node resources, since the destination would not be provided with all of the cells required to reconstruct the packet. The primary exception is the last cell, since the set EOP end of packet flag will notify the destination computer system 12($m_D$) which received the cell that it was the last cell it would receive related to the packet. Thereafter, the destination and source computer systems 12($m_D$) and 12($m_S$) may make use of predetermined error recovery techniques, such as facilitating retransmission of the discarded packet.

By use of the early packet discard methodology, the control element will, to some extent, reduce the rate at which cells are buffered, increasing the likelihood that it will be able to transfer all of the cells CELL($i$) associated with the packets that it has already started transferring.

Figure 4:
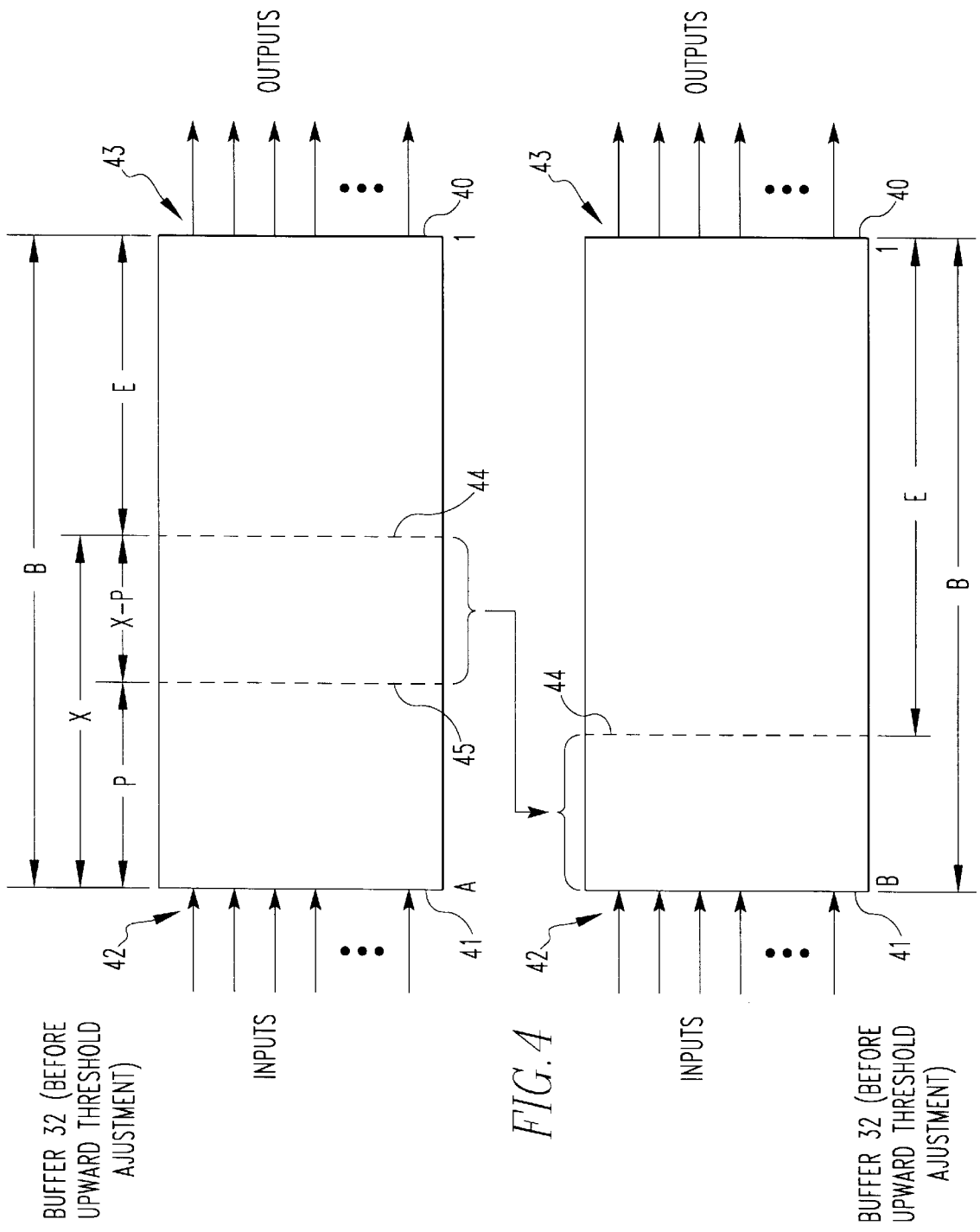
FIGS. 4 and 5 are a diagrams useful in understanding the operation of the routing node depicted in FIG. 3.
Figure 5:
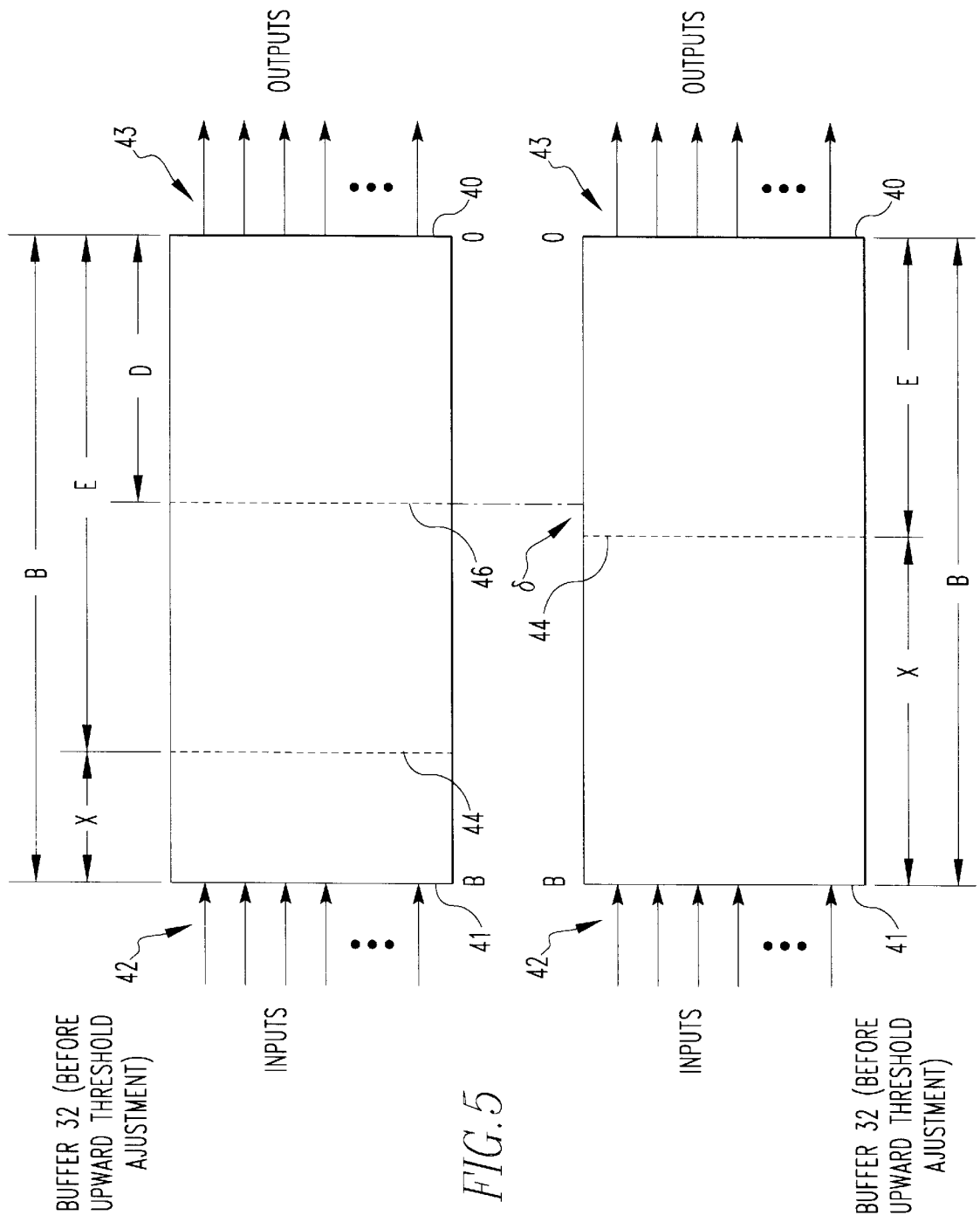

As described above, in activating the early packet discard methodology, and in accordance with the invention, the control element 35 of a router node 11($n$) does not use a fixed buffer contents threshold value, but instead controls and adjusts the buffer contents threshold value in relation to packet and cell traffic through the router node 11($n$). The operations performed by the control element 35 in controlling and adjusting the buffer contents threshold value will be described in connection with FIGS. 4 and 5 and the flowchart in FIGS. 6A through 6D. With reference initially to FIGS. 4 and 5, those FIGS. schematically depict a representation of the buffer 32. As is conventional, the buffer 32 comprises a plurality of storage locations (not separately shown); in the embodiment depicted in FIG. 4, the buffer 32 is shown as comprising "B" storage locations extending from an output storage location "1" at an output end 40 depicted at the right end of the buffer 32 as shown in FIG. 4, to an input storage location "B" at an input end 41 depicted at the left end of the buffer 32. Cells are coupled to the buffer 32 from the input interface 30 through over one or more input lines 42 connected to the input end 41, and are drained from the buffer 32 through the output end 40 and transferred to the output interface 34 over one or more output lines 43. In the representation depicted in FIG. 4, as a cell is loaded into the buffer 32 through the input end 41, it is packed on top of previously-loaded undrained cells, and as each cell is drained from the buffer, the undrained cells in the buffer will shift toward the output end 40, so that so that undrained cells will be packed toward the output end 40.

Also shown in FIG. 4 are three parameters, identified as values "E," "X," and "P" which are useful in connection with understanding of the early packet discard mechanism in accordance with the invention. The parameter "E" depicted in FIG. 4 corresponds to the above-described buffer contents threshold value, and a dashed line 44 is shown at a position in the buffer 32 representing "E" storage locations from the output end 40 of FIG. 4. Accordingly, when the buffer 32 contains a sufficient number of cells that a cell is occupying the E-th storage location, at dashed line 44, the control element 35 activates the early packet discard methodology. The parameter "X" identifies the number of storage locations in the remaining portion of the buffer beyond the "E-th" storage location, and in any case has a value corresponding to "B–E." It will be appreciated that the value of "X" identifies the number of storage locations that the buffer 32 may use in buffering cells input thereto following activation of the early packet discard methodology, before the buffer 32 will be full and it will begin activating the partial packet discard methodology. The value "P" identifies number of storage locations extending from a second dashed line 45 shown in FIG. 4 to the last storage location in the buffer. The second dashed line 45 represents the last storage location in the buffer 32 which contains a cell with a set EOP end of packet flag, indicating that that is the last cell associated with a packet.

The control element 35 may use the values of parameters "E" (that is, the current value of the buffer contents threshold value), "X" and "P" (which it can determine using message traffic statistics it can gather as described below) along with the value of "B" (which corresponds the number of storage locations in the buffer 32), to adjust the value of the buffer contents threshold value, in particular to increase it as shown in FIG. 4 so as to enlarge the portion of the buffer 32 that will be filled before it (the control element 35) activates the early packet discard methodology. As noted above, the portion of the buffer 32 between the threshold line 44 and the last "B-th" storage location of the buffer 32 is provided to reduce the likelihood of the control element 35 proceeding to the partial packet discard methodology after it has activated the early packet discard methodology. Accordingly, (i) if the number of cells buffered in buffer 32 is greater than the buffer contents threshold value, such that the control element 35 has activated the early packet discard methodology, and (ii) if, for packets whose cells the buffer 32 is still buffering under the early packet discard methodology (because the cells were associated with packets that were being buffered when the control element activated the early packet discard methodology), all of the cells with set EOP end of packet flags are located in the region of the buffer 32 beyond the storage location corresponding to the buffer contents threshold value represented by line 44, and below the storage location represented by dashed line 45 (that is, the value of "X–P" in FIG. 4 is positive), the buffer contents threshold value "E" can be enlarged so that the region designated "X–P" in FIG. 4 is located at the upper end of the buffer 32. This will provide that the buffer 32 has sufficient excess space, beyond the threshold at which point the early packet discard methodology is activated, to be able to buffer at least to the last cells associated with the packets that it had been buffering when the early packet discard methodology is activated.

FIG. 5 also shows the buffer 32 as described above, also shows parameter "E," which has the same references as in FIG. 4, and also shows a fourth parameter, namely, parameter "D," which is also useful connection with understanding of the early packet discard mechanism in accordance with the invention, in particular a circumstance in which the buffer contents threshold value can be reduced. In particular, the value of parameter "D" corresponds to the largest number of storage locations which contains a cell over a selected time period, which is represented by the dashed line 46 in FIG. 5. If the value of parameter "D" is less than the current value of the parameter E (the buffer contents threshold value), the buffer contents threshold value can be reduced to correspond to the value of parameter "D," preferably as increased by a small margin "δ" which may serve to reflect possible inaccuracies in measuring or predicting the value of parameter "D." If the value of the buffer contents threshold value is reduced as described above in connection with FIG. 5, the number of storage locations represented by parameter "X," located beyond the storage location corresponding to the buffer contents threshold value, will be increased.

The control element 35 may increase the value of the buffer contents threshold value, as described above in connection with FIG. 4, and decrease the value of the buffer contents threshold value, as described above in connection with FIG. 5, in relation to buffered cell traffic information which it generates as described below. It will be appreciated that increasing the value of the buffer contents threshold value will increase the number of cells that the buffer 32 will buffer before the control element 35 will activate the early packet discard methodology, and it will also reduce the amount of buffering available for avoiding partial packet discard if cell traffic increases. On the other hand, reducing the value of the buffer contents threshold value will decrease the number of cells that the buffer 32 will buffer before the control element will activate the early packet discard methodology. This may increase the likelihood that the control element 35 will activate the early packet methodology relatively early, thereby increasing the likelihood that packets will be discarded, but it will increase the amount of buffering, in the portion of the buffer 32 beyond the storage location identified by the buffer contents threshold value, which is available for cells of packets that the router node 11($n$) has already partially transferred, thereby reducing the likelihood that the buffer 32 will overflow and the control element will have to activate the partial packet discard methodology. The control element 35 may periodically determine an amount to increase or decrease the buffer contents threshold value, using the methodologies described above in connection with FIGS. 4 and 5, based on the determined buffered cell traffic information.

The control element 35 in one embodiment gathers buffered cell traffic information as follows. In addition to controlling the buffering of the cells CELL($i$) by the buffer 32, the control element 35 at periodic time intervals "t" determines values for parameter D($t$) (related to parameter D described above in connection with FIG. 5), the identification of the storage location which contains the last cell CELL($i$) buffered in the buffer 32, and parameter P($t$) (related to parameter P described above in connection with FIG. 4), the position of the storage location in the buffer 32 which contains the last cell CELL($i$) whose EOP end of packet flag is set. In addition, the control element 35 determines values for a parameter PPD($t$), which corresponds to the number of packets which the control element 35 enables to be discarded in response to the partial packet discard methodology.

In response to the gathered buffered cell traffic information, the control element 35 determines whether the value of the buffer contents threshold value is to be adjusted. Initially, the control element 35 determines whether the value of the buffer contents threshold value is to be adjusted in response to a selected relationship between the value of parameter PPD($t$) (that is, the number of packets discarded in response to the partial packet discard methodology) and the value of the parameter P($t$), in particular in one embodiment determining whether the value of parameter PPD($t$), is above a selected percentage of parameter P($t$). If so, the control element 35 reduces the value of the buffer contents threshold value by a selected amount, which in that same embodiment is selected also in connection with the relationship between the values of parameter PPD($t$) and of parameter P($t$).

If the control element 35 determines that the value of the parameter PPD(t) is below the selected level, such that the buffer contents threshold value will not be adjusted in response to a relation between the parameters PPD(t) and P(t), it determines whether the buffer contents threshold value is to be adjusted in response to a relationship among the values of parameters D(t), P(t) and the size of the buffer, B. Initially, the control element 35 determines values of these parameters over a period of "K" prior time intervals and generates statistics $P_M(t)$ as the average value of parameter P(t) and $P_\sigma(t)$, as the variance of the value of parameter P(t), $D_M(t)$ as the average value of parameter D(t). The control element 35 examines the value of statistic $P_\sigma(t)$, the variance of parameter P(t), to determine whether the values of parameters P(t) and D(t) and the statistics $P_M(t)$ and $D_M(t)$ are "reliable" to facilitate adjustment of the buffer contents threshold value. If the value of the variance statistic $P_\sigma(t)$ is relatively small, the values of parameter P(t) determined over the "K" time intervals are all relatively close to the value of its average, statistic $P_M(t)$, which indicates that the values of parameters P(t) and D(t) and the statistics $P_M(t)$ and $D_M(t)$ are sufficiently "reliable" that they may be used to adjust the buffer contents threshold value. On the other hand, if the value of the variance statistic $P_\sigma(t)$ is relatively large, the values of parameter P(t) determined over the "K" time intervals are all widely distributed, which indicates that the values of the parameters and statistics are relatively unreliable, and that they should not be used to adjust the buffer contents threshold value.

If the control element 35 determines that the variance statistic $P_\sigma(t)$ indicates that the values of parameters P(t) and D(t) and the statistics $P_M(t)$ and $D_M(t)$ are sufficiently "reliable" that they may be used to adjust the buffer contents threshold value, it generates the adjusted value generally as described above in connection with FIGS. 4 and 5. In particular, the control element 35 first determines whether it is to increase the buffer contents threshold value. In making that determination, the control element 35 determines a value for $B-[X-(P_M(t)+P_\sigma(t))]$, and if it is larger than the current value for "E," the buffer contents threshold value, it will be used to update the current value for the buffer contents threshold value. It will be appreciated that the value "$[X-(P_M(t)+P_\sigma(t))]$" is analogous to the value "X–P" described above in connection wit FIG. 4, but the sum of the average statistic "$P_M(t)$" and the variance "$P_\sigma(t)$," to provide a margin for error, has been substituted for the addend "P."

If the control element 35 determines that the buffer content threshold value is not to be increased, it will determine whether it is to be decreased. In that operation, it generates a value for $$D_M(t) + \left[\frac{1}{P_\sigma(t)}\right]$$

and if it is less than the current value for the buffer contents threshold value, it will be used to update the current value for the buffer contents threshold value. It will be appreciated that the value $$"\left[\frac{1}{P_\sigma(t)}\right]"$$

corresponds to the margin "δ" described above in connection with FIG. 5.

The control element will periodically perform these operations to maintain the buffer contents threshold value at a level determined in response to the buffered cell traffic information gathered over a window defined by a selected number "k" of prior time intervals. The control element 35 may adjust the buffer contents threshold value at the end of each time interval, using the statistics gathered over overlapping windows each defined by the previous "k" time intervals, or it may adjust the buffer content value at the end of each non-overlapping window defined by "k" time intervals. It will be appreciated that the value of "k" will determine a sensitivity level for the adjustment, with larger values of "k" reducing the sensitivity of the adjustment to recent cell traffic statistics, and smaller values of "k" increasing the sensitivity of the adjustment to recent cell traffic statistics. In addition, if the control element 35 uses the non-overlapping methodology, it will be appreciated that larger values of "k" will increase the time between updates, and smaller values of "k" will decrease the time between updates. In one embodiment, the value of "k" is selected to correspond to twice the maximum round trip time for a cells to be transferred between computer systems 12(m) over the network 10, divided by the line rate, so that the updates to the buffer contents threshold value will also reflect changes in cell traffic caused by flow control arrangements which may be activated by the computer systems 12(m).

Figure 6A:
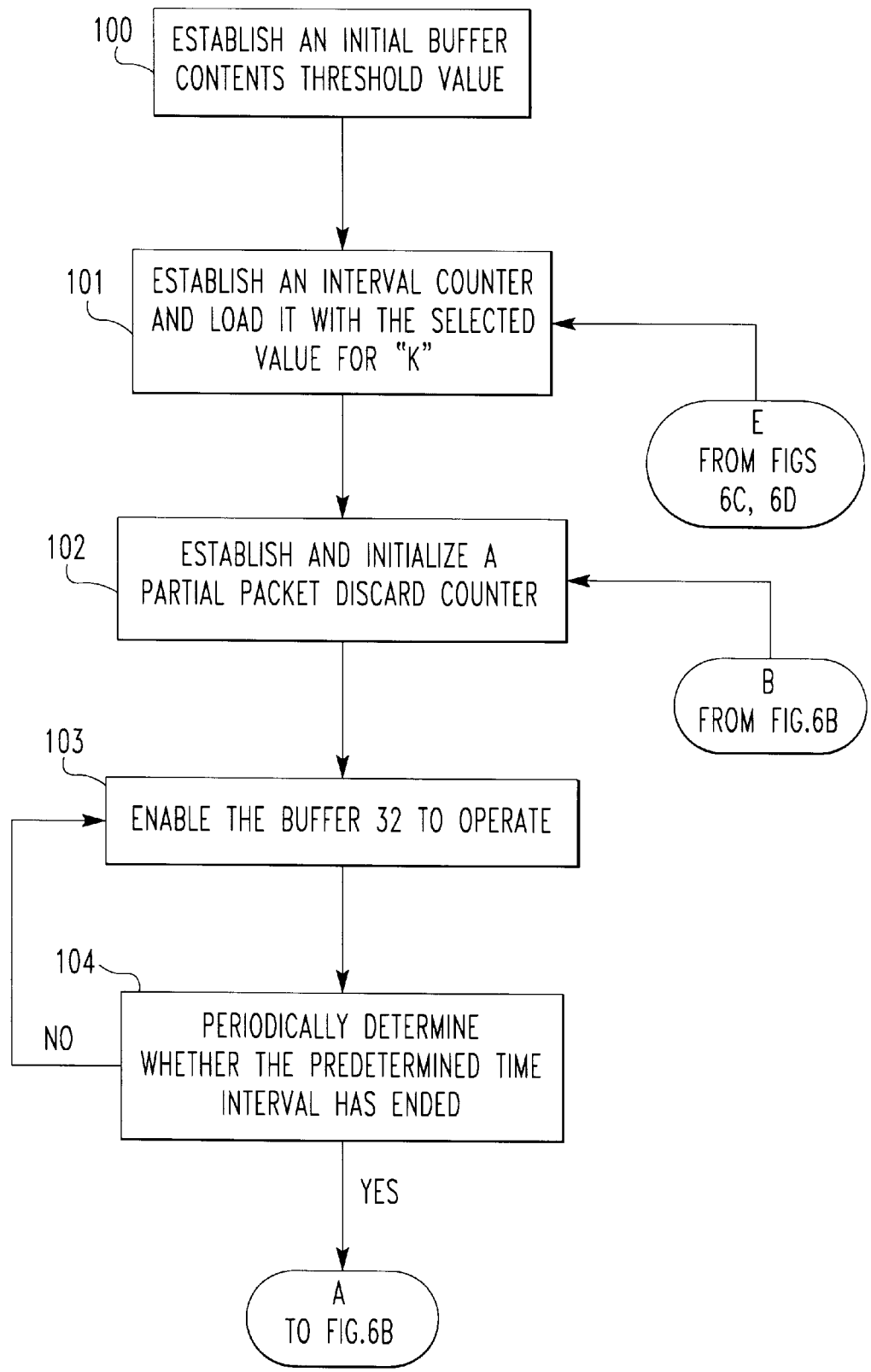
FIGS. 6A through 6D comprise a flow-chart illustrating the operations of the routing node in accordance with the invention.
Figure 6B:
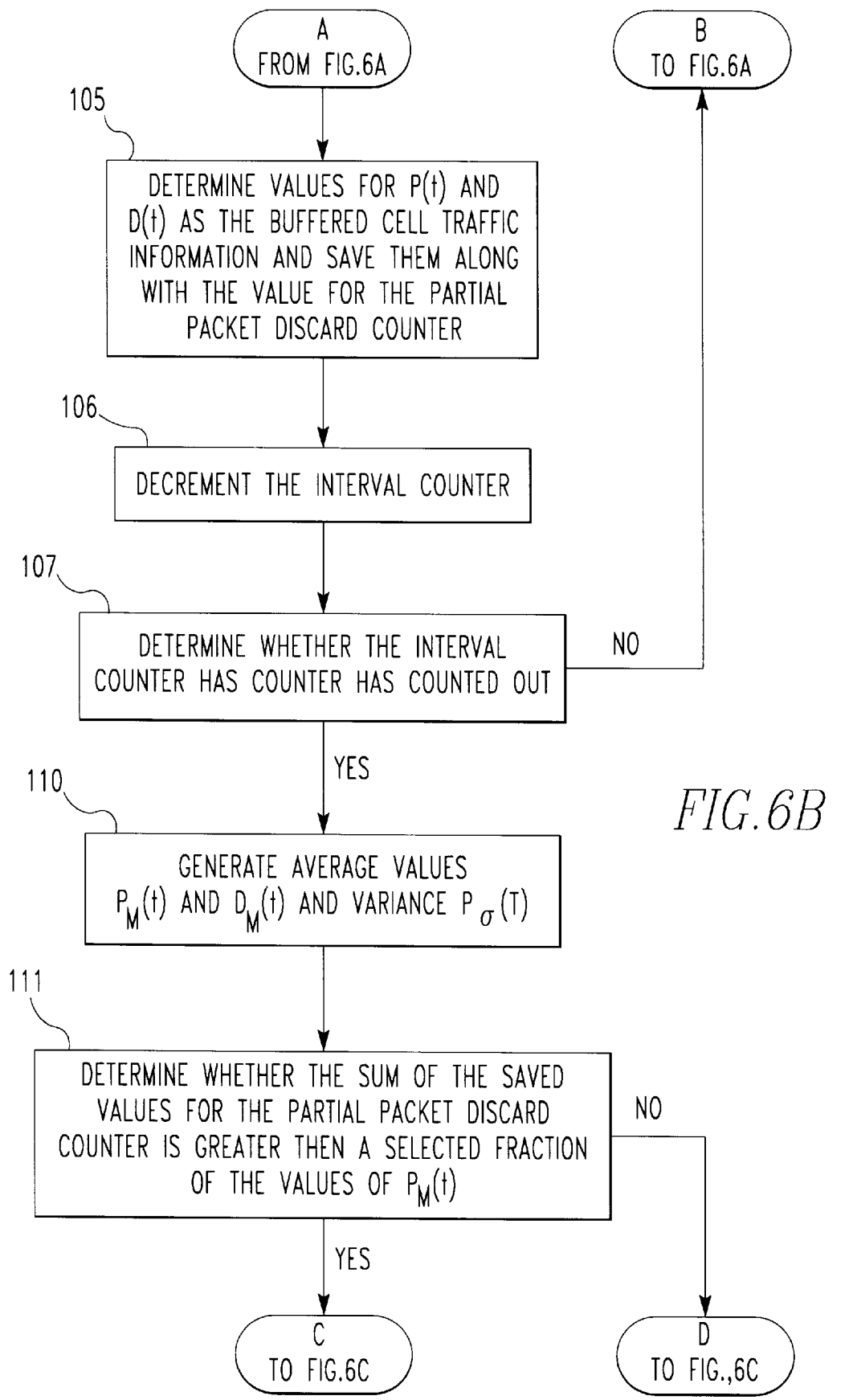
Figure 6C:
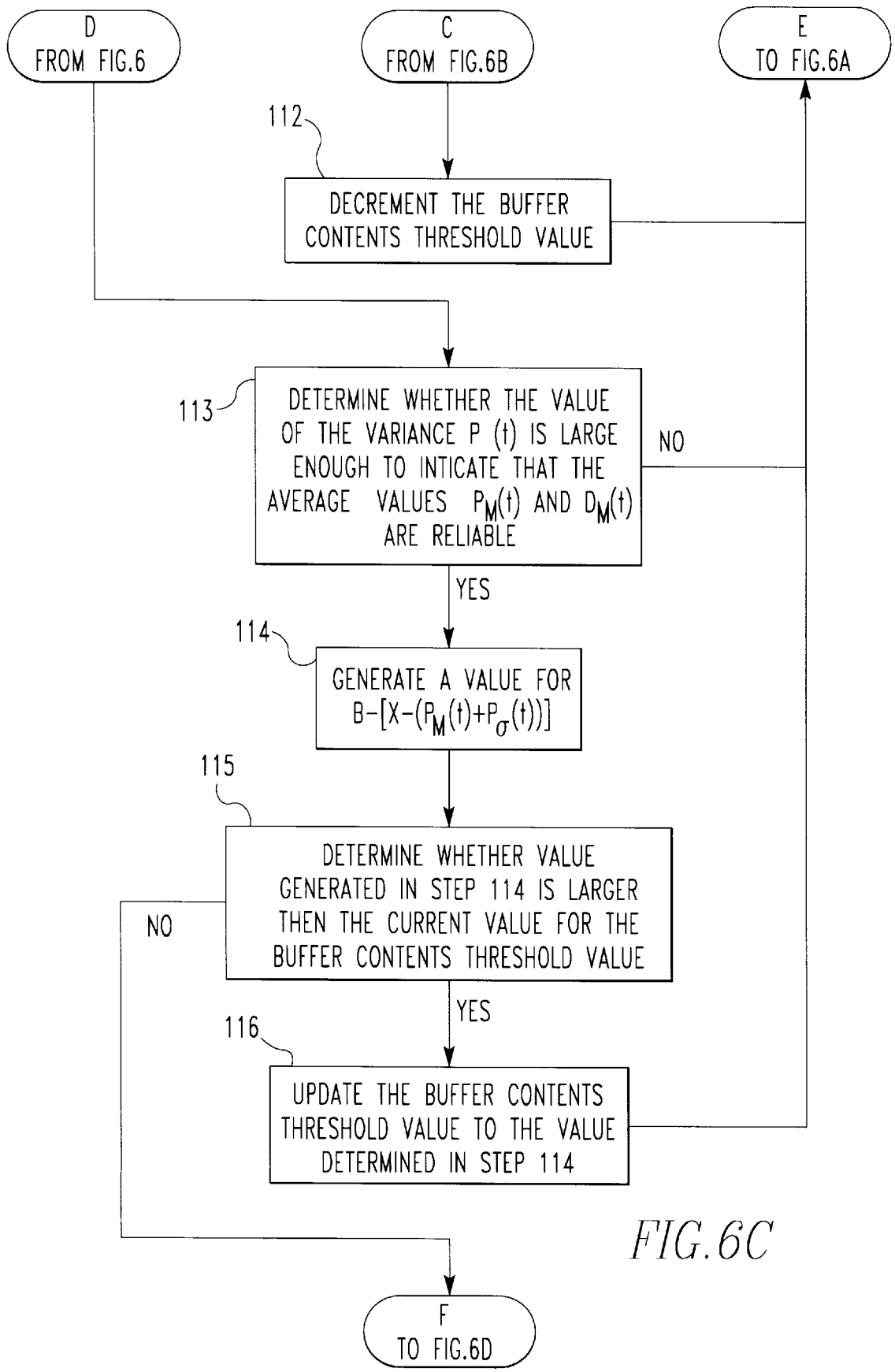
Figure 6D:
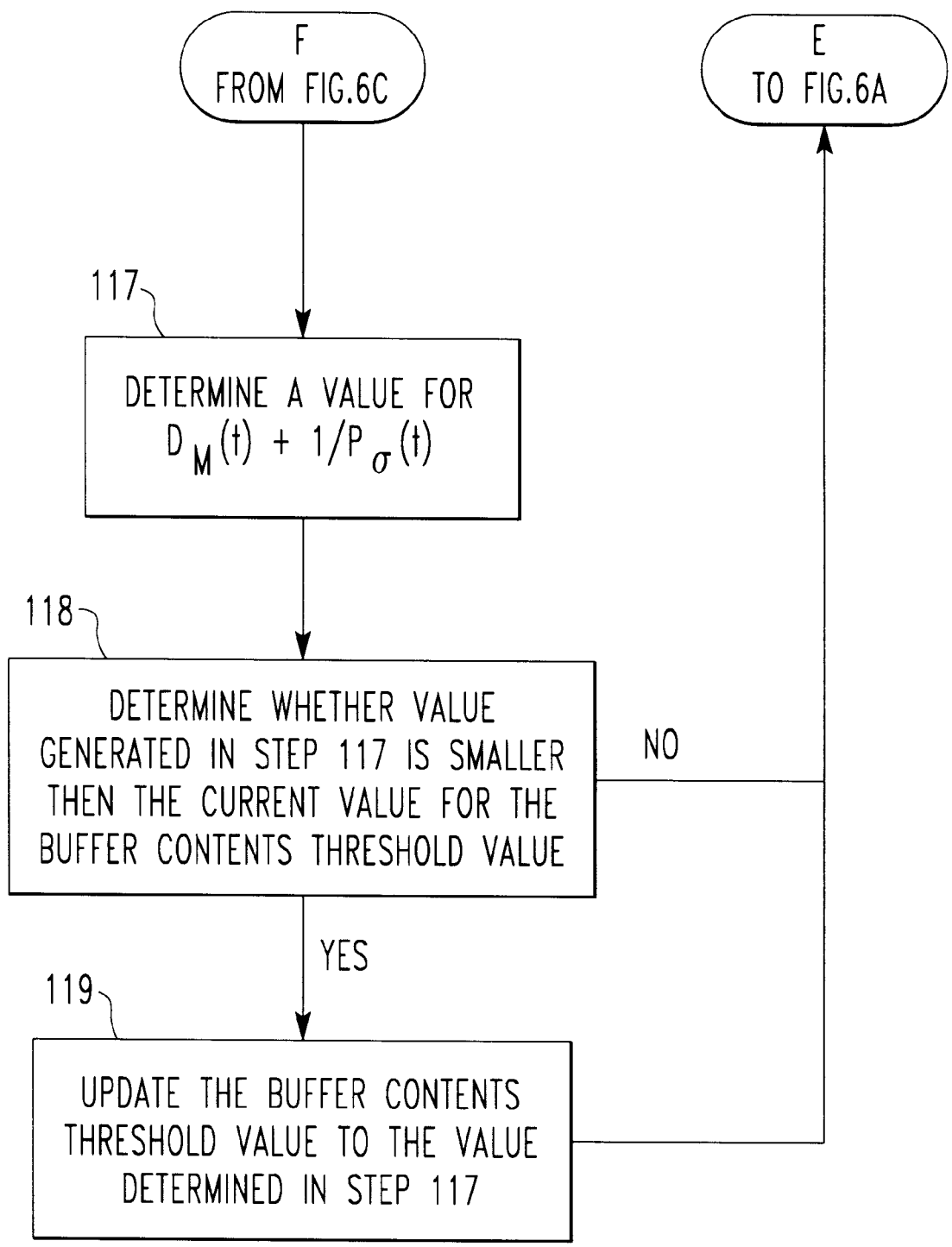

With this background, the operations performed by the control element 35 in controlling the buffer 32 will be described in connection with the flow chart depicted in FIGS. 6A through 6D. In the operations depicted in FIGS. 6A through 6D, it is assumed that the control element 35 utilizes the non-overlapping windows methodology as described above for collecting buffered cell traffic information; modifications to utilize the overlapping windows methodology will be readily apparent to those skilled in the art. With reference to FIG. 6A, the control element 35 first establishes an initial buffer contents threshold value (step 100), which may be selected to be a predetermined fraction of "B," the number of storage locations in the buffer 32, or it may be selected in response to prior experience with other similar networks or, if the control element 35 is part of a routing node 11(n) which is being added to the network 10, with other routing nodes in the same network 10.

After establishing an initial buffer contents threshold value, the control element 35 establishes an interval counter and loads it with the selected value for "k" (step 101). The control element 35 will use the interval counter to determine when it has collected buffered cell traffic information for the entire window, after which it can determine whether and to what extent it is to adjust the value of the buffer contents threshold value. In addition, the control element establishes and initializes a partial packet discard counter (step 102). The control element 35 then enables the buffer 32 to operate as described above in connection with FIG. 3 (step 103). During operations in connection with step 103, the control element 35 increments the partial packet discard counter whenever it enables a packet to be discarded in connection with the partial packet discard methodology.

In addition, during its operations in connection with step 103, the control element 35 periodically determines whether the predetermined time interval has ended (step 104), and if so it determines values for P(t) and D(t) as the buffered cell traffic information and saves them as well as the value for the partial packet discard counter (step 105). Following step 105, the control element will decrement the interval counter (step 105) and determine whether the interval counter has counted out (step 107). At this point, it will be assumed that the interval counter has not counted out, in which case the control element 35 will not have collected buffered cell traffic information for the entire window, in which case the control element will return to step 102.

The control element 35 will perform steps 102 through 107 through a plurality of iterations, in each iteration determining and saving values for P(*t*) and D(*t*) and the partial packet discard counter as the buffered cell traffic information and decrementing the interval counter, until it determines in step 107 that the interval counter has counted out. When that occurs, the control element sequences to a series of steps 110 through 118 to determine whether the buffer contents threshold value is to be updated, and, if so, to update it. Initially, the control element 35 will, in response to the saved buffered cell traffic information P(*t*) and D(*t*), generate the average values $P_M(t)$ and $D_M(t)$ and the variance $P_\sigma(t)$ (step 110). The control element will then determine whether the sum of the saved values for the partial packet discard counter is greater than a selected fraction of the value of $P_M(t)$ (step 111), and if so decrement the buffer contents threshold value (step 112) and return to step 101 to resume operations at the beginning of another window.

On the other hand, if the control element 35 determines in step 111 that the sum of the saved values for the partial packet discard counter is not greater than the selected fraction of the value of $P_M(t)$, it will sequence to step 113 to determine whether the value of the variance $P_\sigma(t)$ is large enough to indicate that the average values $P_M(t)$ and $D_M(t)$ are reliable. If so, it proceeds to a sequence comprising steps 114 through 116 to determine whether the buffer contents threshold value is to be increased. Initially, the control element 35 generates a value for $B-[X-P_M(t)+P_\sigma(t)]$ (step 114) and determines whether that value is larger than the current value for the buffer contents threshold value (step 115). If the control element makes a positive determination in step 115, it sequences to step 116 to update the buffer contents threshold value to the value determined in step 114 and returns to step 101 to resume operations at the beginning of another window.

Finally, if the control element 35 determines in step 115 that the value determined in step 114 was not larger than the current value for the buffer contents threshold value, such that the buffer contents threshold value will not be increased, it will step to a sequence comprising steps 117 through 119 to determine whether the buffer contents threshold value is to be decreased. In those operations, the control element generates a value for $$D_M(t) + \left[\frac{1}{P_\sigma(t)}\right]$$

(step 117) and determines whether that value is smaller than the current value for the buffer contents threshold value (step 118). If the control element makes a positive determination in step 118, it sequences to step 119 to update the buffer contents threshold value to the value determined in step 118. Following either step 119, or step 118 if the control element 35 determines there that the value generated in step 117 is larger than the current value for the buffer contents threshold value, it will return to step 101 to resume operations at the beginning of another window.

It will be appreciated that numerous modifications may be made to the router node 11(*n*) and the control element 35. For example, the control element 35 may make use of a variety of types of buffered cell traffic information and methodologiies, statistical and otherwise, instead of or in addition to the types of information described above. In addition, although the control element 35 has been described as adjusting the buffer contents threshold value using statistical measures such as average and variance in for cell traffic, other statistical methods and measures may find utility. In addition, although the control element has been described as actually generating the statistical measures used to adjust the buffer contents threshold value while the node 11(*n*) is in operation, it will be appreciated the control element 35 may be obtain the buffer contents threshold value from look-up tables or the like, which may be generated using the statistical methodologies described above and which identify buffer contents threshold values as a function of cell traffic.

In addition, it will be appreciated that the partial packet discard methodology and early packet discard methodology with adjustable buffer contents threshold value may be useful in a variety of types of networks in addition to networks such as network 10 which implement the ATM (asynchronous transfer mode) data transfer methodology.

Although the network 10 in FIG. 1 is shown as being connected to computer systems 12(*m*) to facilitate transfer of information thereamong, it will be appreciated that the network 10 may be connected to diverse types of devices for transferring a variety of types of information, including, but not limited, to devices for generating and receiving video information, digital imaging information, voice information and the like.

It will also be appreciated by those skilled in the art that the control element 35 may be implemented using digital hardware, a suitably programmed digital computer (such as a microprocessor) or a combination of digital hardware and a suitably programmed digital computer.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. An ATM computer network including a plurality of routing nodes, each routing node being connected to selected ones of the other routing nodes and at least some of the routing nodes being connected to one of a plurality of packet sources or one of a plurality of packet destinations, each packet having a unique path from its packet source to its packet destination through routing nodes, each routing node routing a packet generated by its packet source to one of the packet destinations along only one path, each packet including a plurality of serially-transmitted cells, each cell having a virtual circuit used for identifying the unique path it is to travel from its packet source to its packet destination, at least some of said routing nodes, in response to detection of a selected degree of congestion, enabling an early packet discard control arrangement in which they discard cells which they receive which are related to packets for which they did not receive a cell prior to activation of the early packet discard mechanism, at least some of said routing nodes periodically adjusting the degree of congestion at which they will activate the early packet discard mechanism in relation to information corresponding to rates of reception and transmission of cells over a selected period of time prior thereto, each node having an interval counter with a selected value k which determines time intervals when the degree of congestion is periodically adjusted.

2. A routing node for use in connection with an ATM computer network including a plurality of routing nodes, the routing node being connected to selected ones of the other routing nodes, and at least some of the routing nodes being connected to one of a plurality of sources or one of a plurality of destinations, each packet having a unique path from its packet source to its packet destination through routing nodes, each routing node routing a packet generated by its source to one destination along only one path, each packet including a plurality of serially-transmitted cells, each cell having a virtual circuit used for identifying the unique path it is to travel from its packet source to its packet destination, said routing node comprising:

A. a buffer for receiving and buffering cells to be transmitted to other routing nodes in the network or to a packet destination; and B. a buffer control for selectively enabling the buffer to receive and buffer cells, the buffer control enabling an early packet discard control arrangement in which, in response to the buffer contemporaneously buffering a selected threshold number of cells, it disables the buffer from receiving and buffering received cells which are related to packets for which it did not begin receiving cells prior to enabling the early packet discard control arrangement mechanism, the buffer control periodically adjusting the threshold number in relation to information corresponding to a rate at which said buffer is buffering cells over a selected period of time thereto, and an interval counter with a selected value k which determines time intervals when the threshold number of cells is periodically adjusted.

3. A routing node as defined in claim 2 in which the buffer control periodically adjusts the threshold number in relation to a buffered cell value as a selected function of the number of cells buffered by said buffer over said selected period of time.

4. A routing node as defined in claim 3 in which said selected function is an averaging function, in which the buffer control periodically adjusts the threshold number in relation to an average buffered cell value as an average of the number of cells buffered by said buffer over said selected period of time.

5. A routing node as defined in claim 4 in which said buffer control comprises:

A. a threshold store for storing a threshold value;

B. an occupancy statistics generator for generating the average buffered cell value corresponding to the average number of cells buffered by said buffer over said selected period of time;

C. a comparator for comparing the threshold value stored by said threshold store to said average buffered cell value; and D. a control module for periodically enabling the occupancy statistics generator to generate said average buffered cell value and said comparator to compare the threshold value stored by said threshold store to said average buffered cell value, the control module enabling said average buffered cell value to be stored in said threshold store if the comparator determines that the average buffered cell value is less than the threshold value stored by said threshold store.

6. A routing node as defined in claim 5 in which said buffer control further includes a statistics reliability assessment module for generating a statistics reliability assessment value, the control module using the statistics reliability assessment value in determining whether to enable said average buffered cell value to be stored in said threshold store.

7. A routing node as defined in claim 6 in which at least some cells received by said routing node include an end-of-packet indicator which indicate that each respective cell is an end of a packet, and in which said buffer comprises a series of storage locations each for storing one of said cells, the buffer control further periodically adjusting the threshold number in relation to a second selected function of the last of said storage locations in which a cell is stored in which a said cell is stored which has an end-of-packet indicator, said statistics reliability assessment module generating the statistics reliability assessment value as a function of a variance value corresponding to the variance of the last of the storage locations in which a said cell is stored which has an end-of-packet indicator.

8. A routing node as defined in claim 4 in which at least some cells received by said routing node include an end-of-packet indicator which indicate that each respective cell is an end of a packet, and in which said buffer comprises a series of storage locations each for storing one of said cells, the buffer control further periodically adjusting the threshold number in relation to a second selected function of the last of said storage locations in which a cell is stored which has an end-of-packet indicator.

9. A routing node as defined in claim 8 in which said second selected function is a variance function.

10. A routing node as defined in claim 8 in which the buffer control comprises:

A. a threshold store for storing a threshold value;

B. an occupancy statistics generator including:

i. an average buffered cell statistics generator for generating the average buffered cell value corresponding to the average number of cells buffered by said buffer over said selected period of time;

ii. a variance generator for generating a variance value corresponding to the variance of the last of the storage locations in which a said cell is stored which has an end-of-packet indicator; and iii. a composite statistics generator for generating a composite statistics value as a selected function of the average buffered cell value and the variance value;

C. a comparator for comparing the threshold value stored by said threshold store to said composite statistics value; and D. a control module for periodically enabling the statistics generator to generate said composite statistics value and said comparator to compare the threshold value stored by said threshold store to said composite statistics value, the control module enabling said composite statistics value to be stored in said threshold store if the comparator determines that the composite statistics value is less than the threshold value stored by said threshold store.

11. A routing node as defined in claim 10 in which said control module further uses the variance value in determining whether to enable said composite statistics value to be stored in said threshold store.

12. A routing node as defined in claim 10 in which said composite statistics generator generates said composite statistics value as a sum of said average buffered cell value and an inverse of said variance value.

13. A routing node as defined in claim 2 in which at least some cells received by said routing node include an end-of-packet indicator which indicate that each respective cell is an end of a packet, and in which said buffer comprises a series of storage locations each for storing one of said cells, the buffer control periodically adjusting the threshold number in relation to the average of the last of the storage locations storing a cell including an end-of-packet indicator over said selected period of time.

14. A routing node as defined in claim 13 in which said buffer control comprises:
   A. a threshold store for storing a threshold value;
   B. an occupancy statistics generator for generating an occupancy statistic value as a selected function of the last of the storage locations storing a cell including an end-of-packet indicator over said selected period of time;
   C. a comparator for comparing the threshold value stored by said threshold store to said occupancy statistic value; and
   D. a control module for periodically enabling the occupancy statistics generator to generate said occupancy statistic value and said comparator to compare the threshold value stored by said threshold store to said occupancy statistic value, the control module enabling said occupancy statistic value to be stored in said threshold store if the comparator determines that the average buffered cell value is greater than the threshold value stored by said threshold store.

15. A routing node as defined in claim 14 in which said buffer comprises a predetermined number of storage locations, and said selected function corresponds to a difference function between (i) said predetermined number and (ii) a difference function between (a) the predetermined number and the threshold value and (b) the last of the storage locations storing a cell including an end-of-packet indicator over said selected period of time.

16. A routing node as defined in claim 14 in which said occupancy statistics generator includes:
   A. an occupancy value generator for generating an occupancy value as said selected function of the last of the storage locations storing a cell including an end-of-packet indicator over said selected period of time;
   B. a variance generator for generating a variance value corresponding to the variance of the last of the storage locations in which a said cell is stored which has an end-of-packet indicator; and
   C. an occupancy statistics value generator for generating said occupancy statistics value as a sum of said occupancy value and said variance value.

17. A routing node as defined in claim 14 in which said control module further uses the variance value in determining whether to enable said composite statistics value to be stored in said threshold store.

18. A routing node as defined in claim 2 in which said buffer control further enables a partial packet discard arrangement in which, in response to the buffer contemporaneously buffering a second selected threshold number of cells, it disables the buffer from receiving and buffering received cells, the buffer control enabling said early packet discard control arrangement if the partial packet discard arrangement discards a selected number of cells.

19. A routing node as defined in claim 18 in which said buffer control enables said early packet discard control arrangement if the partial packet discard arrangement discards a selected number of cells over a predetermined partial packet discard time period.

20. A routing node as defined in claim 18 in which said buffer control enables said early packet discard control arrangement if the partial packet discard arrangement discards cells associated with a selected number of packets.

21. A routing node as defined in claim 20 in which said buffer control enables said early packet discard control arrangement if the partial packet discard arrangement discards cells associated with a selected number of packets over said predetermined partial packet discard period.

22. A method of operating a routing node, the routing node being for use in connection with an ATM computer network including a plurality of routing nodes, the routing node being connected to selected ones of the other routing nodes, and at least some of the routing nodes being connected to one of a plurality of sources or one of a plurality of destinations, each packet having a unique path from its packet source to its packet destination through routing nodes, each routing node routing a packet generated by its source to its destinations along only one path, the method including the steps of:
   A. receiving and buffering cells to be transmitted to other routing nodes in the network or to a packet destination in a buffer along only one path;
   B. selectively enabling the buffer to receive and buffer cells, in the process enabling an early packet discard control arrangement in which, in response to the buffer contemporaneously buffering a selected threshold number of cells, it disables the buffer from receiving and buffering received cells which are related to packets for which it did not begin receiving cells prior to enabling the early packet discard control arrangement mechanism, the threshold number being periodically adjusted in relation to information corresponding to a rate at which said buffer is buffering cells over a selected period of time prior thereto; and
   C. adjusting the threshold number after a predetermined time interval based on an interval counter with a selected value k which determines the time interval when the threshold number is adjusted.

23. A method as defined in claim 22 in which the threshold number is periodically adjusted in relation to a buffered cell value as a selected function of the number of cells buffered by said buffer over said selected period of time.

24. A method as defined in claim 23 in which said selected function is an averaging function, in which the threshold number is periodically adjusted in relation to an average buffered cell value as an average of the number of cells buffered by said buffer over said selected period of time.

25. A method as defined in claim 24 in which said periodic adjustment step includes the steps of:
   A. storing a threshold value;
   B. generating the average buffered cell value corresponding to the average number of cells buffered by said buffer over said selected period of time;
   C. comparing the threshold value stored by said threshold store to said average buffered cell value; and
   D. enabling said average buffered cell value to be stored in said threshold store if the average buffered cell value is less than the threshold value stored by said threshold store.

26. A method as defined in claim 25 in which the periodic adjustment step further includes the steps of generating a statistics reliability assessment value, and using the statistics reliability assessment value in determining whether to enable said average buffered cell value to be stored in said threshold store.

27. A method as defined in claim 26 in which at least some cells received by said routing node include an end-of-packet indicator which indicate that each respective cell is an end of a packet, and in which said buffer comprises a series of storage locations each for storing one of said cells, the buffer control further periodically adjusting the threshold number in relation to a second selected function of the last of said storage locations in which a cell is stored in which a said cell is stored which has an end-of-packet indicator, the statistics reliability assessment value being generated as a function of a variance value corresponding to the variance of the last of the storage locations in which a said cell is stored which has an end-of-packet indicator.

28. A method as defined in claim 24 in which at least some cells received by said routing node include an end-of-packet indicator which indicate that each respective cell is an end of a packet, and in which said buffer comprises a series of storage locations each for storing one of said cells, the threshold number being adjusted in relation to a second selected function of the last of said storage locations in which a said cell is stored which has an end-of-packet indicator.

29. A method as defined in claim 28 in which said second selected function is a variance function.

30. A method as defined in claim 28 in which said periodic adjustment step includes the steps of:
   A. storing a threshold value in a threshold store;
   B. an occupancy statistics generation step including the steps of:
      i. generating the average buffered cell value corresponding to the average number of cells buffered by said buffer over said selected period of time;
      ii. generating a variance value corresponding to the variance of the last of the storage locations in which a said cell is stored which has an end-of-packet indicator; and
      iii. generating a composite statistics value as a selected function of the average buffered cell value and the variance value;
   C. comparing the threshold value to said composite statistics value; and
   D. periodically enabling said composite statistics value to be stored in said threshold store if the comparison step determines that the composite statistics value is less than the threshold value stored by said threshold store.

31. A method as defined in claim 30 in which said variance value is used in determining whether to store the composite statistics value in said threshold store.

32. A method as defined in claim 30 in which said composite statistics value is generated as a sum of said average buffered cell value and an inverse of said variance value.

33. A method as defined in claim 22 in which at least some cells received by said routing node include an end-of-packet indicator which indicate that each respective cell is an end of a packet, and in which said buffer comprises a series of storage locations each for storing one of said cells, the threshold number being adjusted in relation to the average of the last of the storage locations storing a cell including an end-of-packet indicator over said selected period of time.

34. A method defined in claim 33 in which said periodic adjustment step includes the steps of:
   A. storing a threshold value in a threshold store;
   B. generating an occupancy statistic value as a selected function of the last of the storage locations storing a cell including an end-of-packet indicator over said selected period of time;
   C. comparing the threshold value stored by said threshold store to said occupancy statistic value; and
   D. enabling said occupancy statistic value to be stored in said threshold store if the comparator determines that the average buffered cell value is greater than the threshold value stored by said threshold store.

35. A method as defined in claim 34 in which said buffer comprises a predetermined number of storage locations, and said selected function corresponds to a difference function between (i) said predetermined number and (ii) a difference function between (a) the predetermined number and the threshold value and (b) the last of the storage locations storing a cell including an end-of-packet indicator over said selected period of time.

36. A method as defined in claim 34 in which said occupancy statistics generation step includes the steps of:
   A. generating an occupancy value as said selected function of the last of the storage locations storing a cell including an end-of-packet indicator over said selected period of time;
   B. generating a variance value corresponding to the variance of the last of the storage locations in which a said cell is stored which has an end-of-packet indicator; and
   C. generating said occupancy statistics value as a sum of said occupancy value and said variance value.

37. A method as defined in claim 34 in which said variance value is used in determining whether to enable said composite statistics value to be stored in said threshold store.

38. A method as defined in claim 22 further including a partial packet discard step in which, while a second selected threshold number of cells are being buffered, the buffer is disabled from receiving and buffering subsequently received cells, the early packet discard control arrangement being enabled if selected number of cells are discarded during the partial packet discard step.

39. A method as defined in claim 38 in which said early packet discard control arrangement is enabled if, during the partial packet discard arrangement, a selected number of cells are discarded over a predetermined partial packet discard time period.

40. A method as defined in claim 38 in which said early packet discard control arrangement is enabled if cells associated with a selected number of packets are discarded during the partial packet discard step.

41. A method as defined in claim 40 in which said early packet discard control arrangement is enabled if during the partial packet discard step cells associated with a selected number of packets are discarded over said predetermined partial packet discard period.

* * * * *